S. C. PECKHAM.
NUTCRACKER.
APPLICATION FILED MAY 9, 1908.
947,932.
Patented Feb. 1, 1910.
3 SHEETS—SHEET 1.
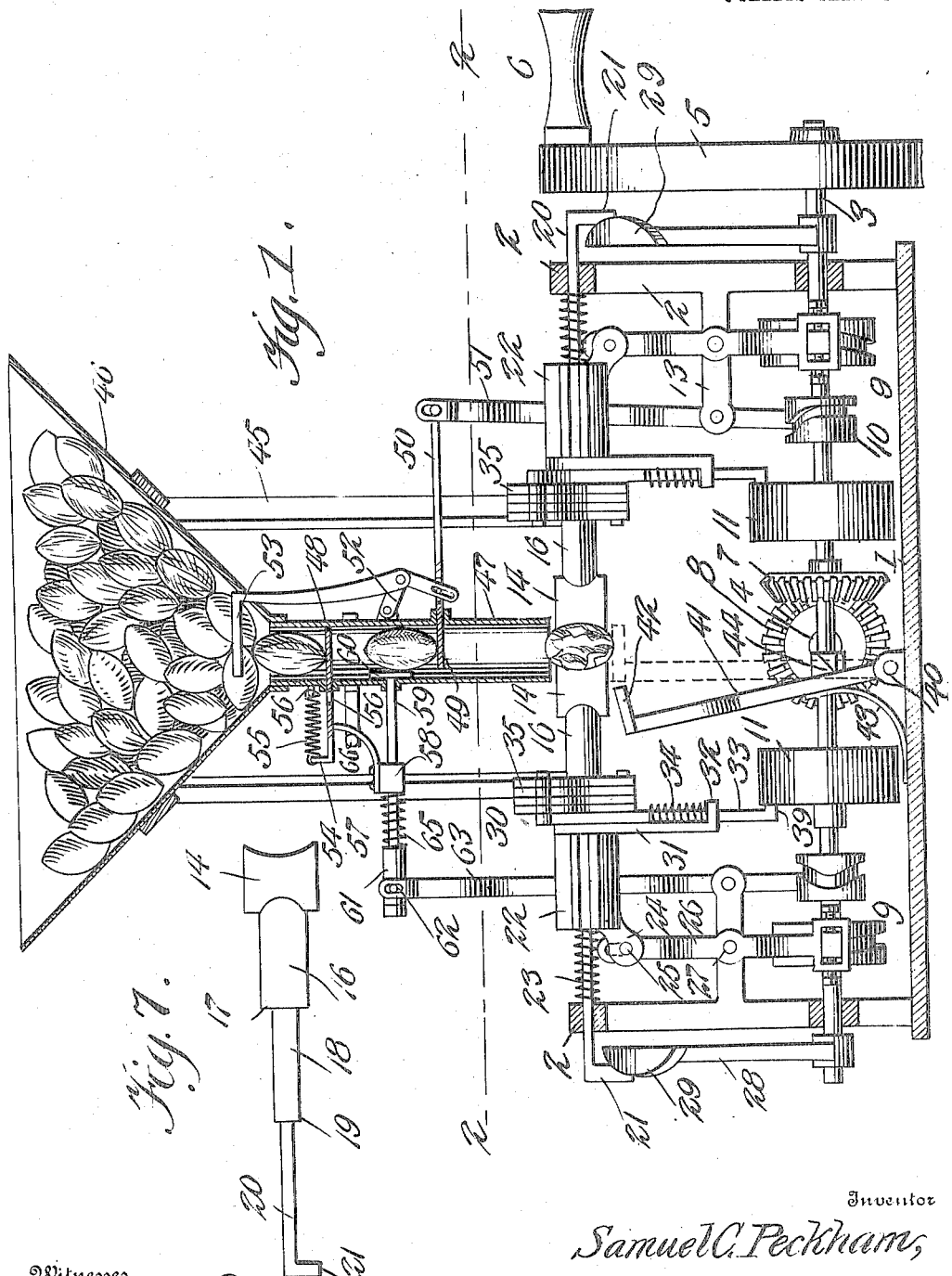
Witnesses
Inventor
Samuel C. Peckham,
By Victor J. Evans
Attorney

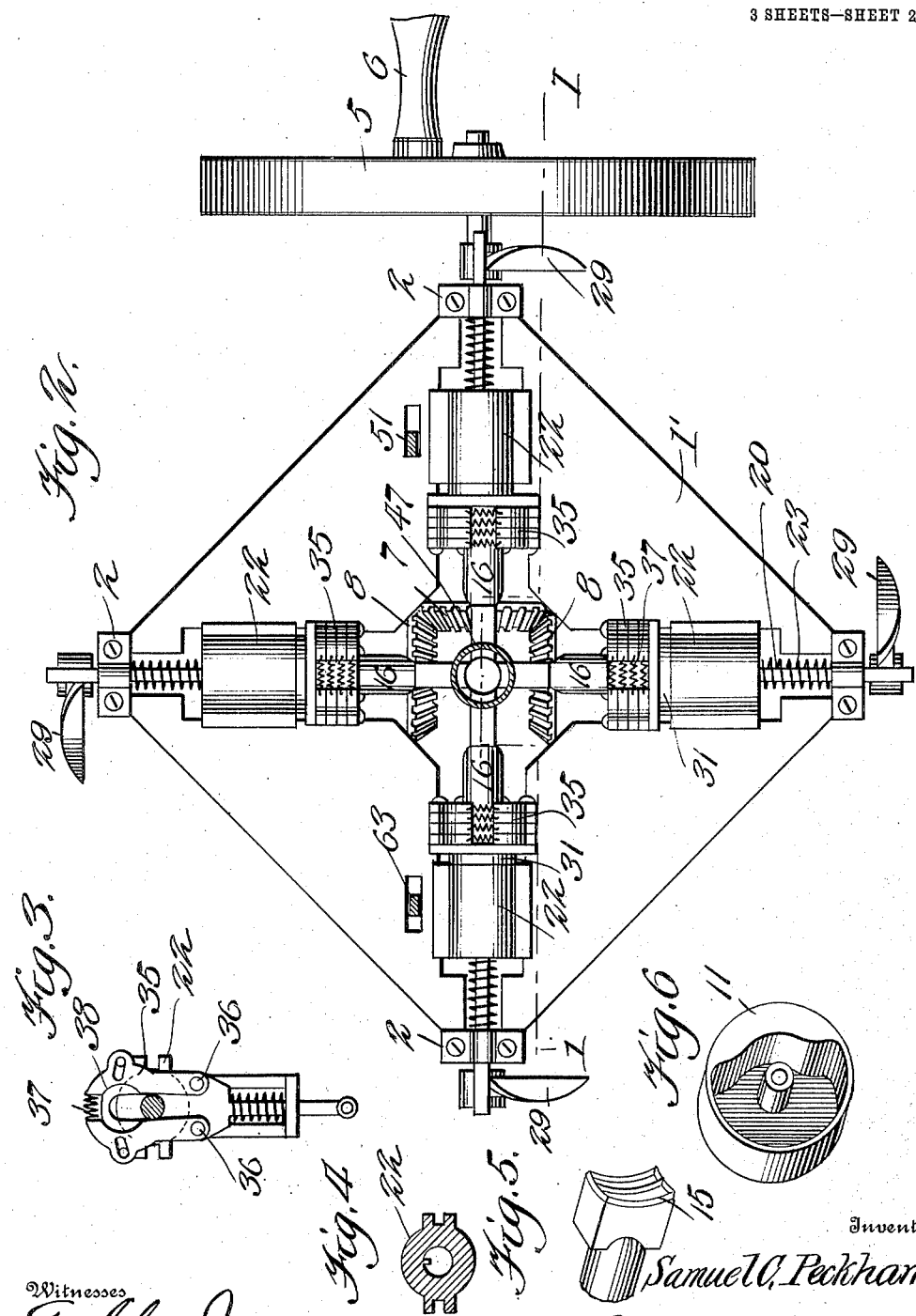

S. C. PECKHAM.
NUTCRACKER.
APPLICATION FILED MAY 9, 1908.
947,932.
Patented Feb. 1, 1910.
3 SHEETS—SHEET 3.
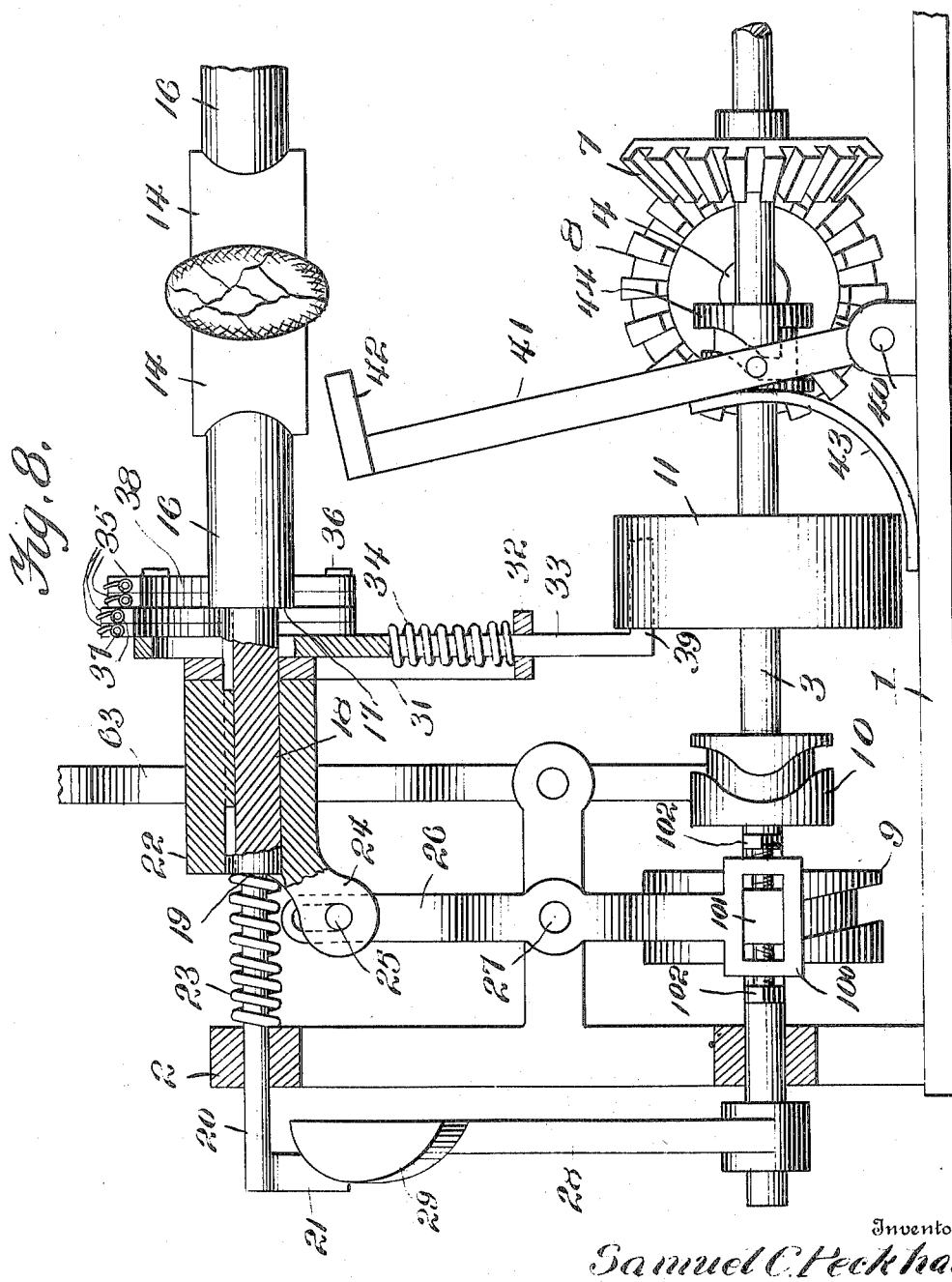
Witnesses
Inventor
Samuel C. Peckham
By Victor J. Evans
Attorney ved with oppositely arranged radially dis-

UNITED STATES PATENT OFFICE.

SAMUEL C. PECKHAM, OF AUSTIN, TEXAS.

NUTCRACKER.

947,932.      Specification of Letters Patent.      Patented Feb. 1, 1910.

Application filed May 9, 1908. Serial No. 431,797.

*To all whom it may concern:*

Be it known that I, SAMUEL C. PECKHAM, a citizen of the United States, residing at Austin, in the county of Travis and State of Texas, have invented new and useful Improvements in Nutcrackers, of which the following is a specification.

This invention relates to nut crackers, and the object of the invention is to produce a machine whereby nuts may be automatically fed from a suitable hopper through a discharge tube upon a tilting table and there be engaged by suitable nut cracking members, which when the nut is fractured will automatically withdraw from the nut and the table be automatically inclined to deposit the broken nut upon a suitable chute or conveyer.

Another object of the invention is to provide a machine of this character with a hopper having an outlet chute, said hopper being provided with an agitator whereby the nuts are stirred and directed toward the chute, and said chute being provided with sliding doors, the space between the doors being occupied by a "feeling" member which is adapted to operate the upper door when the space between the doors is not occupied by a nut so as to allow a nut to be deposited upon the lower or outlet door.

With these, and other objects in view, the invention resides in the novel construction of elements and their arrangement in operative combination, hereinafter fully described and claimed.

In the accompanying drawings, Figure 1 is a vertical longitudinal section upon the line 1—1 of Fig. 2. Fig. 2 is a horizontal sectional view upon the line 2—2 of Fig. 1. Fig. 3 is a front elevation of the throw regulating device. Fig. 4 is a transverse sectional view of the sliding collar which actuates the fracturing device. Fig. 5 is a detail perspective view of one of the nut fracturing jaws. Fig. 6 is a perspective view of one of the internal cam wheels. Fig. 7 is a side elevation of one of the nut cracking or fracturing members. Fig. 8 is an enlarged vertical sectional view of the assembled parts along the axis of the nut cracking members, parts being shown in elevation.

In the accompanying drawings the numeral 1 designates the base of the machine and the numeral 1' a platform or table positioned above the base. The base is provided with oppositely arranged radially disposed posts 2. These posts 2 are adapted to support the table 1', which is constructed in sections, as clearly illustrated in Fig. 2 of the drawings, as well as being adapted for the reception of the operating shafts 3 and 4. The shaft 3 extends longitudinally of the base 1 and is provided upon one of its ends with a crank wheel 5 which has a suitable handle 6 whereby the shaft 3 may be rotated. The shaft 3, in the embodiment of the device illustrated in the drawings, is provided with a beveled gear 7 engaging similar gears 8 upon the radially disposed shafts 4. By this arrangement it will be noted that when the shaft 3 is revolved the latter will, through the medium of the bevel gear 7, impart motion to the radially disposed shafts 4. The shafts 3 and 4 are each provided with precisely similar mechanism and are adapted to operate in unison so that the reference numerals applied to the devices upon one of the shafts may be equally applicable to the remainder of the shafts.

The shafts are each provided with peripheral grooved cam wheels 9 and 10 and an internal cam wheel 11, the purposes of which will hereinafter be set forth. The posts 2 are provided with bearing surfaces upon their upper extremities and adjacent their points of connection with the platform or table 1', as indicated by the numeral 12, and have inwardly projecting arms 13, as clearly illustrated in Fig. 1 of the drawings. The bearings 12 are adapted for the reception of the arms of a nut cracking or fracturing device. These devices each comprise a nut fracturing jaw which may have its face provided with arcuate and transverse knives 15 and have an extension 16 providing a shoulder 17, a reduced extension 18 which in turn is also provided with a similar reduced extension 20 providing a shoulder 19 between the said member 20 and the member 18. The extension 20 is bent upon itself or otherwise formed with an offset or finger 21, as clearly illustrated in the figures of the drawings. The reduced portions 20 of the nut cracking elements are adapted to be positioned within the bearings 12 of the arms 2 while their larger portions 18 are adapted for engagement with a slidable operating collar 22. This collar 22 has its sides provided with suitable ears adapted for engagement with the walls of the adjacent sections of the table or platform 1' which provides suitable bearings whereby the said collar 13 may be slid toward the center of the device in a manner hereinafter to be set forth. The bore of the collar 22 is sufficiently large to receive the extension 18 of the nut fracturing device, but is not large enough to receive the extension 16 of the said device, and the collar has its lower portion provided with outwardly extending ears 24 which are adapted for the reception of a pintle 25 and whereby the slotted extension of an arm 26 is connected to the said collar. The arm 26 is pivotally connected with the offset arm 13 of the member 2, as at 27, and has its lower portion provided with a rectangular member 100 which is cut away to provide a substantially rectangular frame. Adapted to be positioned within this frame is a sliding block 101 which may be adjusted toward either end of the frame through the medium of threaded elements 102 each engaging threaded orifices in the sides of the frame and having their ends bearing against the sides of the member 101. This block 101 is adapted to be positioned within the groove of the wheel 9, and it will be noted that when the shaft 3 is revolved, carrying with it the cam wheel 9, the arm 26 will be oscillated upon its pivot 27 thereby forcing the collar 22 upon its bearing and upon the extension 18 in both directions.

The shafts 3 and 4 are each provided with upstanding arms 28 having cam faces 29 which are adapted to engage the offset 21 of the nut cracking element, and positioned between the arms 2 and the shoulders 19 of the said fracturing element is a pressure spring 23 which exerts pressure between the member 2 and the shoulder 19 and tends to force the fracturing element forward toward the center of the device after the cam 29 has passed the offset 21.

Positioned upon the arm 18 of each of the nut fracturing devices is the throw regulating device 30. These devices 30 each comprise a main body portion 31 having an offset 32 provided with a suitable opening and adapted for the reception of a sliding member 33. This member 33 has its lower portion reduced and adapted for the reception of a helical spring 34 which is interposed between the offset 32 and the body of the member 33 so as to normally force the body of the member upward. This member 33 is provided with a suitable slot or elongated opening whereby the member may be slid vertically in regard to the shaft of the nut cracking element. The member 33 is provided with a plurality of pivoted tumblers 35. These tumblers are arranged in pairs adjacent each other and upon each side of the throw regulating element and are secured to the member 33 through the medium of suitable pintles 36 while their upper ends are connected through the medium of tension springs 37. The space between the lower arms of the tumblers 35 is sufficient to allow for the reception of the extension 18 of the nut cracking or fracturing members, but it is not sufficient to allow for the reception of the enlarged portion 16 of the said nut cracking members. The tumbler members 35 have their upper inner faces concaved as designated by the numeral 38 and the said tumblers are provided with suitable slots adapted for the reception of pin stops whereby the movement of the said tumblers in either direction is limited. The portions of the tumblers formed by the concaved cut away portions 38 are of a size sufficient to snugly engage the enlarged portion 16 of the nut fracturing element. The member 33 is provided with a suitable offset finger 39 which is adapted to play within the cut away portion of the internal cam wheel 11 carried by the shafts 3 and 4.

The operation of the mechanism above described is as follows: It is to be understood that the fracturing jaws 14 of the nut cracking apparatus are adapted to move away from each other only a sufficient distance to allow a nut delivered from a hopper to a tilting table, (both the table and hopper to be hereinafter described) so as to provide a substantial pocket within which the nut is received and whereby the nut is prevented from falling or slipping away from the fracturing elements before being operated upon by the said elements. The shafts are revolved and operate the mechanism in the following manner: First, the internal cam wheel 11 acting upon the offset finger of the member 33 draws downwardly the slotted member 31 carrying with it the tumblers 35 which have their curved cut away portions in a direct line with the enlarged portion 16 of the nut fracturing element; second, the cam face 29 carried by the arm 28 is brought into contact with the offset finger 21 of the nut fracturing device forcing the said device rearwardly against the pressure of the spring 23 contacting the shoulder 19; third, immediately after the cam 29 passes the offset finger 21 of the nut fracturing device, the spring 23 acting upon the shoulder 19 forces the fracturing head 14 forward into contact with the nut now deposited upon the table and the offset finger of the member 33 being released from its engagement with the internal cam of the wheel 11 is forced upwardly under the pressure of the spring 34, thus allowing one or more of the pairs of tumblers, according to the size of the nut, to contact the shoulder 17 of the fracturing device; and finally, the arm 26 is oscillated through the medium of the peripheral cam wheel 9 which exerts pressure upon the member 22 thereby forcing the member 31 and the tumblers carried thereby forwardly causing the tumblers engaging the shoulder 17 of the fracturing member to exert forward pressure upon the said member and thus fracture the nut. This operation is continued indefinitely or until all of the nuts within a hopper, hereinafter to be described, are fractured, it being understood that the parts, after fracturing the nuts are returned to their initial positions through the medium of the cams and springs connected therewith.

Arranged upon the base 1 of the machine, and directly below the center of the nut fracturing jaws 15, when the latter are in coaction with each other, are ears 40 which are adapted to receive the leg 41 of a pivoted table 42. This table is adapted to engage with a cam member 44 carried upon the shaft 3 and may be normally forced into engagement with said cam through the medium of a spring 43. The cam is so positioned upon the shaft 3 as to bring the table directly beneath the mouth of a tube connected with the nut receiving hopper when the nut is to be delivered between the fracturing devices and is so arranged as to force the table 42 rearwardly or out of the path of the nut when fractured so as to allow the same to be received upon a suitable chute or conveyer, not shown.

The base 1 is provided with suitable standards 45, adapted to support a cone-shaped hopper 46. This hopper 46 is provided with an outlet tube 47, positioned immediately above the fracturing jaws 15. The tube 47 is provided with a pair of longitudinally extending sliding doors 48 and 49. The door 49 is positioned in close proximity with the open mouth of the tube, and is adapted to serve as an outlet valve for the nuts from the hopper 46. This door 49 is provided with a stem 50, engaging a rocking arm 51 pivotally connected with the extending arm 13 of one of the posts 2, and having its lower end provided with an offset adapted to engage the cam groove of the wheel 10, whereby the door 49 is oscillated, upon the rotation of the shaft 3, to open and close the tube 47. The tube 47 is provided with a suitable ear adapted for pivotal engagement with the link 52, having its outer end attached to the vertical arm of an L-shaped agitator member 53, working within the hopper 46, and having its lower arm provided with a suitable elongated slot adapted for engagement with a pin provided upon the extension 50 of the sliding door 49. By this arrangement it will be noted that as the door 49 is slid to open or close the tube 47 the agitator 53 is rocked so as to thoroughly move or agitate the nuts within the hopper 46.

The door 48 is positioned within the hopper a suitable distance away from the door 49, so as to provide a chamber between these doors suitable for the reception of a single nut. The door 48 has its outer edge upturned or provided with a finger 54, and this finger is provided with a suitable perforation and adapted for the reception of one end of a tension spring 55, the outer end of which being positioned in a suitable eye 56 provided upon the hopper 47. The spring 55 normally tends to force the door 48 within the tube 47 to effectively close the tube and prevent the entrance of nuts to the sliding door 49. The door 48 is provided with a suitable opening 56, and this opening is adapted to be engaged by a finger 57 provided upon a member 58. This member 58 is positioned upon the arm 59 of the "feeling" member 60. The member 60 is provided with an enlarged head, positioned between the doors 48 and 49 and has its outer extremity provided with an enlarged collar 61. This collar 61 is provided with diametrically opposite pintles 62 adapted for engagement with suitable slots provided within the bifurcated head of a rocking arm 63. This arm 63 is pivoted to one of the extensions 13 of one of the posts 2 and has its lower extremity provided with a suitable offset or finger adapted to engage the cam groove of one of the wheels 10. Interposed between the collar 61 and the member 58 is a light spring 65. The member 58 is rigidly secured upon the extension 59, and the collar 61 free to slide upon the extension 59 against the pressure of the spring 65.

It will be noted that should the compartment between the sliding doors 48 and 49 be vacant, the "feeler" 60 will be pressed forward until the finger 57 engages within the slot 56 of the door 48, when the rearward movement of the arm 59 will force the door 48 out of the tube 47, so as to allow a nut to drop through the upper portion of the tube upon the door 49. The tube 47 is provided with a bracket arm 66, positioned directly in the path of the finger 57, and adapted to contact the said finger upon the rearward movement thereof to release the same from its engagement with the cutaway portion 56 and to allow the door 48 to return, under the pressure of the spring 55, to its normal position within the tube to close the same and to prevent the entrance of more nuts to the compartment between the doors 48 and 49.

With this construction it will be noted that provisions are made whereby only a single nut is allowed upon the door 49, as it will be apparent that should a nut be in this compartment when the "feeling" device is operated, the "feeler" contacting a nut will be returned from entering the compartment and that the collar 61 will merely slide upon the extension 59 and compress the spring 65. Should however the compartment be empty, the "feeler" will be forced forward until the finger 57 engages the cut away portion 56 of the door 48 to open the same in the manner heretofore described.

The mechanism for operating the feeler arm is so arranged as to cause the feeler to be operated twice to each revolution of the operating crank, so as to operate the door 48 quickly, to prevent the entrance of more than one nut upon the door 49 and also to agitate a nut within the tube to deposit it upon the door 49.

Having thus fully described the invention what is claimed as new is:

1. A nut receiving hopper provided with an outlet tube having slidable doors, a feeling plunger operating between the doors to allow the passage of the nut to the lower door when the chamber between the doors is vacant, nut fracturing members beneath the outlet tube, a tilting table beneath the fracturing elements, means for retaining the table in a position to receive a nut, means for simultaneously operating the fracturing members to act upon the nut, and means for tilting the table after the nut has been fractured.

2. In a nut cracking machine, means for fracturing a nut, a hopper connected with the machine, a discharge tube for the hopper, a sliding outlet door for the tube, an agitator working within the hopper connected with the outlet door, means for operating the outlet door, a valve above the outlet door, means connected with the valve for normally closing the tube, and a feeling plunger between the valve and the door, said plunger adapted to operate the valve when the chamber between the valve and the outlet door is vacant said plunger being adapted to remain immovable when the chamber is occupied by a nut.

3. In a nut cracking machine, means for fracturing a nut, a hopper adapted for the reception of the nut, an outlet tube for the hopper, an outlet door for the tube, an agitator having an arm working within the hopper and connected with the outlet door, means for operating the door and agitator, a sliding valve within the tube, a spring connected with the valve to normally close the opening of the tube between the valve and the outlet door, a feeler plunger intermediate of the valve and the outlet door, a finger upon the plunger, a collar loosely mounted upon the plunger rod, a spring intermediate of the collar and the finger, means for moving the collar and the plunger rod, the finger being adapted to engage the valve to retract the same from the tube when the plunger is inserted within the tube, and means for disengaging the finger from the valve to allow the valve to resume its normal position within the tube.

4. In a nut cracking machine, the combination with a plurality of radially disposed nut cracking members, and means for simultaneously moving the members toward each other, of throw regulating devices connected with the arms of the nut cracking members, said throw regulating devices comprising a body having an elongated slot engaging the arms of the nut cracking members, a plurality of tumblers having concave edges pivotally connected with the body member and engaging the arms of the nut cracking members, and a slidable collar mounted upon the arm of the nut cracking member and means for forcing the slidable collar against the throw regulating device to force the same against the nut cracking members to move the members toward each other.

5. In a nut cracking machine, a plurality of radially disposed nut cracking members, said members having an arm provided with a shoulder, a throw regulating device upon the arm, said throw regulating device comprising a body having an elongated slot by which it is positioned upon the arm and a plurality of oppositely disposed tumblers, the tumblers comprising pivoted arms adapted to normally engage the sides of the arm of the nut cracking members and having concave upper faces, means for forcing the nut cracking members toward each other, and means for lowering the throw regulating devices so as to bring one of the series of tumblers into engagement with the shoulder of the arm of the nut cracking element, and means for forcing the throw regulating element against the shoulder to force the nut cracking elements toward each other.

6. In a nut cracking machine, a plurality of radially disposed nut fracturing members, each of said members comprising jaws provided with sharpened ribs and having arms provided with a shoulder, a throw regulating device upon each of the arms, said throw regulating device comprising a body having an elongated slot and being provided with a depending leg having an offset, an internal cam wheel upon the machine engaging the offset, a plurality of tumblers upon the body, the tumblers being provided with recessed portions and arranged in pairs positioned adjacent each other, tension springs connecting the pairs of tumblers, a sliding collar upon the arms of the nut fracturing members and contacting with the body of the throw regulating device, ears upon the collar, a pivoted arm connected with the ears, an offset upon the arm, and a grooved cam wheel engaging the offset.

7. In a nut cracking machine, nut cracking members, said members being provided with nut engaging jaws having sharpened ribs and being provided with arms, bearings upon the machine for the arms, a spring between the bearing and outer offset of each of the arms, throw regulating devices upon the arms adjacent the shoulders thereof, said throw regulating devices each comprising a body portion provided with an offset having a perforation, a member having an arm engaging the perforation, and said member having its lower portion extending below the offset and being provided with an angularly disposed finger, a spring between the offset and the body of the member, a plurality of pivoted tumblers being arranged in pairs having their upper portions connected by resilient members and the tumblers being provided with concaved cut away portions near their upper extremities, a sliding collar upon the arm of each of the nut fracturing elements, ears upon the collar, a pivoted member connected with the ears of the collar, a shaft upon the machine, an internal cam wheel upon the shaft engaging the offset finger of the throw regulating device, a curved cam upon the shaft engaging the pivoted member connected with the collar ears having a member, a cam face upon the shaft and adapted to contact the offsets of the arms of the nut fracturing elements, and means for rotating the shaft.

8. In a nut cracking machine, a hopper provided with an outlet tube, a pivoted table beneath the outlet tube, radially disposed nut fracturing elements between the table and the tube, an outlet door and a valve within the tube, a feeling plunger between the valve and the door, means for operating the outlet door, means for moving the feeling plunger to operate the valve when the chamber between the outlet door and the valve is vacant, means for simultaneously moving the nut fracturing members toward each other, means for swinging the table to receive a nut, and means for swinging the table rearwardly to dispose of the nut after the same has been broken by the fracturing elements.

9. In a nut cracking machine, the combination of a plurality of radially disposed nut cracking members and means for simultaneously moving the members toward each other to fracture a nut, of a hopper provided with an outlet tube, an outlet door slidably mounted within the tube, an agitator working within the hopper connected with the outlet door, means for operating the door and agitator, a sliding valve above the door, said valve having its body provided with an opening and its outer end upturned to provide an ear, a spring connecting the ear with the tube to normally force the door within the tube, a stop member upon the tube, a sliding feeling plunger between the valve and the door, an enlargement provided with a finger normally contacting the sliding valve upon the plunger, a collar upon the plunger and slidably connected therewith, a spring between the collar and the enlargement, the collar being provided with oppositely disposed fingers and adapted for engagement with the bifurcated arms of a pivoted member, said pivoted member having its lower end provided with an offset, a shaft upon the machine, and a grooved cam upon the shaft, and said grooved cam adapted to engage with the offset of the pivoted member.

In testimony whereof I affix my signature in presence of two witnesses.

SAMUEL C. PECKHAM.

Witnesses:
J. M. EARNEST,
L. M. LAYTON.